United States Patent
May et al.

(10) Patent No.: US 10,205,672 B2
(45) Date of Patent: Feb. 12, 2019

(54) MULTI-DEVICE SYNCHRONIZATION OF DEVICES

(71) Applicant: Cirrus Logic International Semiconductor Ltd., Edinburgh (GB)

(72) Inventors: Jeffrey A. May, Dripping Springs, TX (US); Vivek Jindal, Austin, TX (US); Anu Chakravarty, Austin, TX (US); Terence C. Bowness, Austin, TX (US); Christian Larsen, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 156 days.

(21) Appl. No.: 15/226,197

(22) Filed: Aug. 2, 2016

(65) Prior Publication Data

US 2017/0078213 A1 Mar. 16, 2017

Related U.S. Application Data (60) Provisional application No. 62/217,371, filed on Sep. 11, 2015.

(51) Int. Cl.
| | |
|---|---|
| *H04L 12/863* | (2013.01) |
| *H04L 29/08* | (2006.01) |
| *H04L 12/40* | (2006.01) |
| *G06F 13/372* | (2006.01) |

(52) U.S. Cl.
CPC ........ *H04L 47/6225* (2013.01); *G06F 13/372* (2013.01); *H04L 12/40* (2013.01); *H04L 67/10* (2013.01)

(58) Field of Classification Search
CPC ................ H04R 19/04; H04R 2499/11; H04R 2420/03; H04R 5/04
See application file for complete search history.

(56) References Cited

U.S. PATENT DOCUMENTS

| | | | |
|---|---|---|---|
| 4,922,536 A | 5/1990 | Hoque | |
| 2006/0136635 A1 | 6/2006 | Beaudoin et al. | |
| 2017/0142495 A1* | 5/2017 | Laksono | ............ H04N 21/6587 |
| 2018/0046595 A1* | 2/2018 | Pitigoi-Aron | ....... G06F 13/4291 |
| 2018/0052802 A1* | 2/2018 | Pitigoi-Aron | ....... G06F 13/4295 |

OTHER PUBLICATIONS

International Application No. PCT/US2016/049919, International Search Report and Written Opinion of the International Search Authority, dated Nov. 7, 2016, 8 pages.

* cited by examiner

*Primary Examiner* — Jung H Park
(74) *Attorney, Agent, or Firm* — Jackson Walker L.L.P.

(57) ABSTRACT

A distributed network system may include a shared communication bus that operates in accordance with a communication protocol and a plurality of devices coupled to the shared communication bus. The communication protocol may define periods of time and an order by which each of the plurality of devices actively transmit data on the shared communication bus such that only one of the plurality of devices actively transmits data on the shared communication bus at a time to a remaining number of the plurality of devices through the shared communication bus. When the remaining number of the plurality of devices are not actively transmitting data, the remaining number of the plurality of devices may receive data via the shared communication bus so that bi-directional communication is established among the plurality of devices on the shared communication bus.

36 Claims, 5 Drawing Sheets

MULTI-DEVICE SYNCHRONIZATION OF DEVICES

RELATED APPLICATIONS

The present disclosure claims priority to U.S. Provisional Patent Application Ser. No. 62/217,371, filed Sep. 11, 2015, which is incorporated by reference herein in its entirety.

FIELD OF DISCLOSURE

The present disclosure relates in general to circuits for audio systems, including without limitation personal audio devices such as wireless telephones and media players, and more specifically, to control, response, and/or state machine synchronization of distributed network of audio devices within an audio system.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers.

Within both consumer and professional audio equipment, it is often necessary that an operational response among different audio channels is matched. For example, a requirement of such audio systems is that data path group delays and acoustic responses to events (e.g., an interrupt, device error, etc.) be matched across all audio channels, and that at a minimum, such responses be controlled and deterministic.

However, oftentimes in such devices, multiple amplifiers and multiple data paths may be used to drive a plurality of speakers. Most commonly, placement of such amplifiers may be localized to the speakers themselves, meaning that amplifiers may not be in proximity to one another and an amplifier may be subject to local error events not observed by one or more other amplifiers. As an example, a battery connection to a main printed circuit board housing the amplifiers may not be symmetric to the amplifiers, meaning that there may be more series parasitic losses between one amplifier and the battery supply than with another amplifier and the battery supply. If an equivalent amount of power from the battery is consumed by each amplifier, the local supply voltage at one amplifier may be lower than at another amplifier. Such inequality in power consumption may produce a condition whereby one amplifier has to respond to a low voltage error condition, but another amplifier may not observe the error condition.

Often in portable battery powered devices, an amplifier's response of such a low voltage condition may be to reduce the volume of the amplifier, thereby reducing the current consumption of the amplifier in order to preserve the battery's supply voltage for the rest of the system. However, if this audio attenuation is performed on one channel but not another channel, it may have undesirable acoustical effects which create a negative experience to the end user. To illustrate, human hearing is very often sensitive to changes in audio. This sensitivity allows humans to discern things, like direction of the source, approximate distance to the source, whether sound has bounced off an object, and identifying various abnormalities and changes in an expected sound. Both ears are typically leveraged as a part of this process, bringing into the stereo nature of sound. The process of hearing effectively thus creates an "image" of the sound.

For media playback, an audio signal is often intentionally manipulated in order to take advantage of how sound is interpreted by the brain. This intentional audio manipulation is especially true for multi-channel sound. For multi-channel sound, in order for this intentional audio manipulation to be effective and reproducible, certain system-level parameters need to be known and remain constant or deterministic. As electronic audio components become more miniaturized, they also tend to become more distributed in the end system. However, with this distributed architecture, the deterministic requirements, such as channel-to-channel phase and amplitude, have not changed, and thus, an additional approach is needed to ensure the key deterministic relationships of an audio system, such as the multi-device synchronization for audio devices.

Utilizing a software approach, such as an interrupt-based scheme along with control port writes, to mitigate response differences between amplifiers has limitations. Such approach requires a control port master device to: (1) monitor for interrupts, (2) be able to distinguish between different error conditions, possibly requiring control port reads, (3) determine a response to the error condition, and (4) then exchange the information with the other amplifier(s). With conditions continually changing, this approach can be burdensome on the developer, software resources, and still may not have an appropriate response time to properly handle the error condition.

Other unmatched behavior, such as indeterminate group delays (or inter-channel phase shifts), can also produce undesirable acoustic effects. In a controlled manner, manipulating signal phase along with amplitude and frequency shifting can be used to create acoustic effects, such as sound localization, mimicking reverberation, virtual surround sound, etc. However, when a system does not have sufficient control over the systematic behavior of a distributed network of devices, the hardware system can both interact with the multi-channel acoustic performance of the system and create undesirable acoustic effects of its own.

The controlled matching of group delays or system level responses is not just important for purposes of controlling audio output, but is also important for monitoring systems where the signal timing between devices is a key part of the desired functionality. For example, in ultrasonic applications, such as proximity detection or gesture identification, where timing of the signal is critical, a distributed network of analog-to-digital converters connected to ultrasonic microphones would need to be synchronized. Without this synchronization, the detection algorithms might not be able to acquire enough valid data to respond properly.

SUMMARY

In accordance with the teachings of the present disclosure, one or more disadvantages and problems associated with existing approaches to synchronizing functionality among a distributed network of devices may be reduced or eliminated.

In accordance with embodiments of the present disclosure, a distributed network system may include a shared communication bus that operates in accordance with a communication protocol and a plurality of devices coupled to the shared communication bus. The communication protocol may define periods of time and an order by which each of the plurality of devices actively transmits data on the shared communication bus such that only one of the plurality of devices actively transmits data on the shared communication bus at a time to a remaining number of the plurality of devices through the shared communication bus. When the remaining number of the plurality of devices are not actively transmitting data, the remaining number of the plurality of devices may receive data via the shared communication bus so that bi-directional communication is established among the plurality of devices on the shared communication bus. Each of the plurality of devices may maintain its own respective state information and may operate in accordance with its own respective state information and data it receives via the shared communication bus in order to generate an output signal to an electrical node other than the shared communication bus.

In accordance with these and other embodiments of the present disclosure, a method may include defining periods of time and an order by which each of a plurality of devices coupled to a shared communication bus that operates in accordance with a communication protocol actively transmits data on the shared communication bus such that: (i) only one of the plurality of devices actively transmits data on the shared communication bus at a time to a remaining number of the plurality of devices through the shared communication bus; (ii) when the remaining number of the plurality of devices are not actively transmitting data, the remaining number of the plurality of devices receive data via the shared communication bus so that bi-directional communication is established among the plurality of devices on the shared communication bus; and (iii) each of the plurality of devices maintains its own respective state information and operates in accordance with its own respective state information and data it receives via the shared communication bus in order to generate an output signal to an electrical node other than the shared communication bus.

In accordance with these and other embodiments of the present disclosure, a device for use in a distributed network system may include a transmitter for actively transmitting data in accordance with a communication protocol on a shared communication bus configured to couple to the device and a plurality of other devices coupled to the shared communication bus, a receiver for receiving data via the shared communication bus from at least one of the other devices, and an output for generating an output signal to an electrical node other than the shared communication bus. The communication protocol may define periods of time and an order by which each of the device and other devices actively transmits data on the shared communication bus such that only one of the device and the other devices actively transmits data on the shared communication bus. When the device is not actively transmitting data, the device may receive data via the shared communication bus so that bi-directional communication is established among the device and the other devices on the shared communication bus. The device may maintain its own respective state information and operates in accordance with its own respective state information and data it receives via the shared communication bus in order to generate the output signal.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The multi-device synchronization approach disclosed herein may allow multiple, distributed devices in a network of devices to be aware of the operational state and configuration of each other, effectively performing as a single device on the system, while remaining low impact and low complexity to the system comprising the distributed devices. The multi-device synchronization may remain captive to the devices which are to have their operations synchronized.

Figure 1:
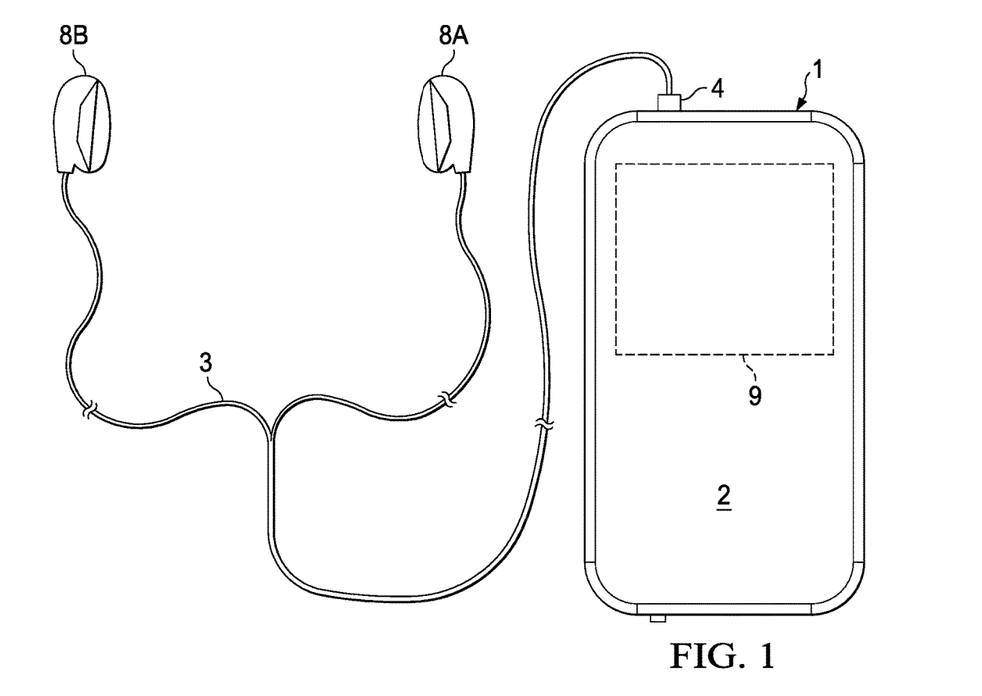
FIG. 1 illustrates an example personal audio device, in accordance with embodiments of the present disclosure.

FIG. 1 illustrates an example personal audio device 1, in accordance with embodiments of the present disclosure. FIG. 1 depicts personal audio device 1 coupled to a headset 3 in the form of a pair of earbud speakers 8A and 8B. Headset 3 depicted in FIG. 1 is merely an example, and it is understood that personal audio device 1 may be used in connection with a variety of audio transducers, including without limitation, headphones, earbuds, in-ear earphones, and external speakers. A plug 4 may provide for connection of headset 3 to an electrical terminal of personal audio device 1. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include an audio integrated circuit (IC) 9 for generating an analog audio signal for transmission to headset 3 and/or another audio transducer.

Figure 2:
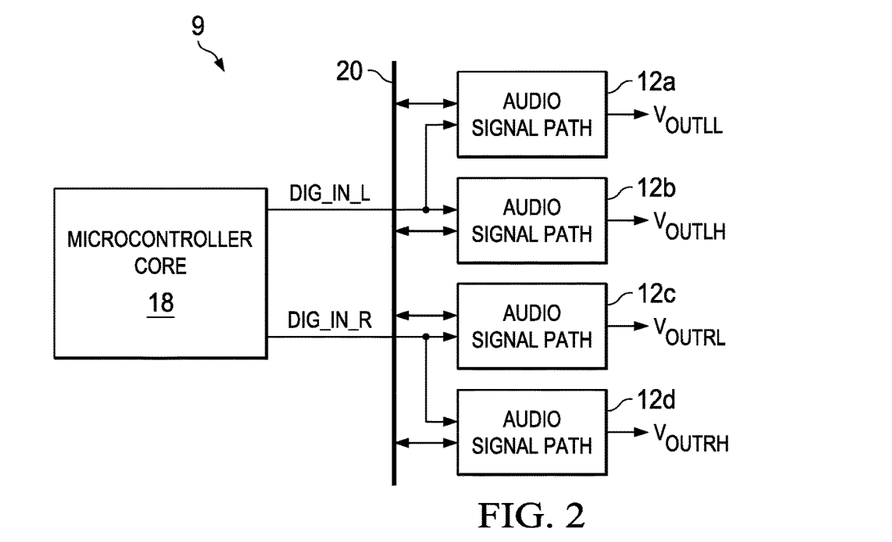
FIG. 2 illustrates a block diagram of selected components of an example audio integrated circuit of a personal audio device, in accordance with embodiments of the present disclosure.

FIG. 2 illustrates a block diagram of selected components of an example audio integrated circuit 9 of a personal audio device, in accordance with embodiments of the present disclosure. As shown in FIG. 2, a microcontroller core 18 may supply a digital audio input signals DIG_IN_L and DIG_IN_R to multiple audio signal paths 12 (e.g., audio signal paths 12a, 12b, 12c, and 12d), each of which may generate its own analog output signal (e.g., $V_{OUTLL}$, $V_{OUTLH}$, $V_{OUTRL}$, and $V_{OUTRH}$) to drive a transducer, such as an audio speaker or headphone. For example, analog output signal $V_{OUTLL}$ may drive a left-side low-frequency speaker (e.g., woofer), analog output signal $V_{OUTLH}$ may drive a left-side high-frequency speaker (e.g., tweeter), analog output signal $V_{OUTRL}$ may drive a right-side low-frequency speaker (e.g., woofer), and analog output signal $V_{OUTRH}$ may drive a right-side high-frequency speaker (e.g., tweeter). Also as shown in FIG. 2, and as described in greater detail below, components of audio signal paths 12a, 12b, 12c, and 12d may be communicatively coupled to a shared communication bus 20 for communicating control and/or state information among such components.

Figure 3:
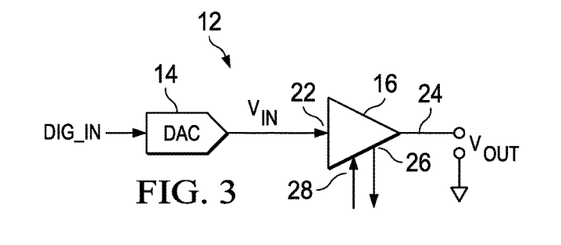
FIG. 3 illustrates a block diagram of selected components of an example audio signal path of an audio integrated circuit of a personal audio device, in accordance with embodiments of the present disclosure.

FIG. 3 illustrates a block diagram of selected components of an example audio signal path 12 of an audio integrated circuit 9 of a personal audio device 1, in accordance with embodiments of the present disclosure. Audio signal path 12 may be used to implement audio signal paths 12a, 12b, 12c, and/or 12d depicted in FIG. 2. As shown in FIG. 3, a digital-to-analog converter (DAC) 14 may receive a digital audio input signal DIG_IN (e.g., DIG_IN_L or DIG_IN_R) and convert the digital audio input signal to an analog signal $V_{IN}$. DAC 14 may supply analog signal $Y_{IN}$ to an amplifier 16 which may receive analog signal $V_{IN}$ at an input 22 of amplifier 16 and may amplify or attenuate audio input signal $V_{IN}$ to provide an audio output signal $V_{OUT}$ (e.g., $V_{OUTLL}$, $V_{OUTLH}$, $V_{OUTRL}$, and $V_{OUTRH}$) at output 24 of amplifier 16, which may operate a speaker, a headphone transducer, a line level signal output, and/or other suitable output. In some embodiments, DAC 14 may be an integral component of amplifier 16. As shown in FIG. 2, amplifier 16 may also include a transmitter 26 for actively transmitting data in accordance with a communication protocol on a shared communication bus (e.g., shared communication bus 20) configured to couple to amplifier 16 and a plurality of other devices (e.g., amplifiers for other audio channels) coupled to the shared communication bus, and a receiver 28 for receiving data via the shared communication bus from at least one of the other devices coupled to the shared communication bus. In some embodiments, transmitter 26 and receiver 28 may be combined into a single functional unit such that only a single pin of amplifier 16 may be coupled to communication bus 20.

Although FIGS. 2 and 3 contemplate that audio IC 9 resides in a personal audio device, systems and methods described herein may also be applied to electrical and electronic systems and devices other than a personal audio device, including audio systems for use in a computing device larger than a personal audio device, an automobile, a building, or other structure.

Figure 4:
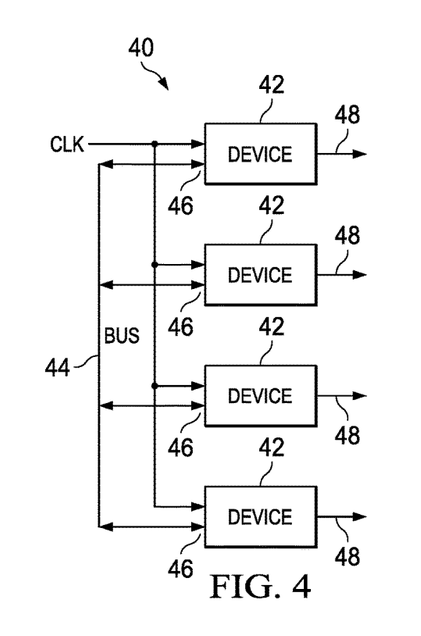
FIG. 4 illustrates a block diagram of selected components of a distributed network of devices coupled to one another via a communication bus, in accordance with embodiments of the present disclosure.

FIG. 4 illustrates a block diagram of selected components of a distributed network 40 of devices 42 coupled together via a communication bus 44 (e.g., which may implement communication bus 20 depicted in FIG. 2), in accordance with embodiments of the present disclosure. In some embodiments, devices 42 may comprise amplifiers 16 of multiple audio signal paths 12, as shown in FIGS. 2 and 3. In other embodiments, devices 42 may comprise other components of an audio signal path, such as a coder-decoder, a DAC, an analog-to-digital converter (ADC), or a sensor (e.g., a microphone or sound pressure sensor). In yet other embodiments, devices 42 may be a component of a system other than an audio system, such as an ultrasonic system (e.g., for proximity detection) wherein each device 42 outputs or drives an ultrasonic signal or a haptic system in which each device 42 outputs or drives a haptic signal. In these and other embodiments, all devices 42 of distributed network 40 may be homogeneous (e.g., all devices 42 may comprise audio amplifiers, all devices 42 may comprise coder-decoders, all devices 42 may comprise DACs, all devices 42 may comprise ADCs, all devices may comprise sensors, etc.).

Although FIG. 4 depicts distributed network 40 having four devices 42, other embodiments consistent with this disclosure may include any number of devices 42.

As shown in FIG. 4, devices 42 may utilize a single, common clock CLK for data timing alignment and synchronization. Common clock CLK may be leveraged from an existing clock of a system comprising distributed network 40, such as a bit clock from a different audio or data bus (e.g., Inter-Integrated Circuit Sound, time division multiplexing, phase division multiplexing, SoundWire, etc.) or a system master clock. As shown in FIG. 4, each device 42 may also comprise a pin 46 coupling device 42 to shared communication bus 44 and an output 48 for outputting an output signal (e.g., an output voltage $V_{OUT}$, in the case of an amplifier 16) to an electrical node other than shared communication bus 20.

Figure 5:
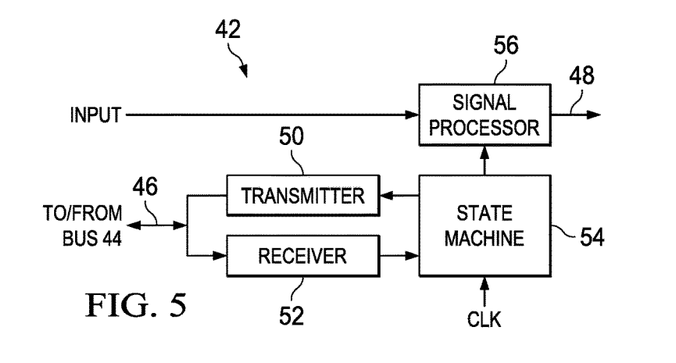
FIG. 5 illustrates a block diagram of selected components of a device, in accordance with embodiments of the present disclosure.

Turning briefly to FIG. 5, FIG. 5 depicts illustrates a block diagram of selected components of a device 42, in accordance with embodiments of the present disclosure. As shown in FIG. 5, a device 42 may include a transmitter 50, a receiver 52, a state machine 54, and a signal processor 56.

Transmitter 50 and receiver 52 may both be coupled via pin 46 to shared communication bus 44. In operation, transmitter 50 may be configured to actively transmit data in accordance with a communication protocol on shared communication bus 44 and receiver 52 may be configured to receive data via shared communication bus 44 from at least one of the other devices 42.

State machine 54 may comprise any system, device, or apparatus configured to maintain respective state information of its device 42 and operate in accordance with such respective state information and data it receives from other devices via receiver 52 and shared communication bus 44 in order to control signal processor 56 to generate an output signal at output 48. Signal processor 56 may comprise any system, device, or apparatus configured to, based on one or more control signals from state machine 54, perform processing on an input signal (e.g., application of gain, attenuation, filtering, etc.) to generate an output signal to output 48.

In addition, based on its respective state information and/or events occurring local to such device 42, state machine 54 may transmit data via transmitter 50 and shared communication bus 44 to other devices 42. Such data may include, without limitation: (1) audio output path group delay matching information, (2) data and audio monitoring group delay matching information, (3) synchronized power up and power down information, (4) synchronized digital volume or gain change information, (5) respective state information, (6) information regarding a configuration change of the device 42 of the system including distributed network 40, (7) information regarding local error detection and/or a local response thereto, (8) device control and/or status information, (9) information relating to control and/or state of any signal processing, and (10) information regarding algorithmic parameters of the device 42. Thus, generally speaking, data communicated on shared communication bus 44 may comprise at least one of status information regarding distributed network 40, status information regarding the device 42 that transmitted the data, and a control parameter for controlling devices 42.

In addition, state machine 54 may be configured to maintain state of a device 42 such that it operates in accordance with the aforementioned communication protocol. Such communication protocol may define periods of time and an order by which each of the devices 42 actively transmit data on shared communication bus 44 such that only one of devices 44 actively transmits data on the shared communication bus, and when a device 42 is not actively transmitting data, such device 42 receives data via shared communication bus 44 so that bi-directional communication is established among devices 42 on shared communication bus 44. Accordingly, state machine 54 may implement the communication protocol such that each device 42 on shared communication bus 44 is pre-configured in order to determine when it is its respective time to transmit on the shared communication bus 44. Such pre-configuration may avoid any data collisions, arbitration, or complexity overhead that would be present if a device 42 would otherwise have to determine whether it is the appropriate time for the particular device to transmit. Transmission slot intervals may be pre-configured via control registers as a part of a power up sequence or externally from a unique hardware configuration (e.g. a pin which also is used to configure an I2C address of the device). For example, such order of transmission could occur in a repeating order based on the pre-configured transmission slot location. In addition, each of devices 42 on shared communication bus 44 may be either pre-configured or hard-coded such that it understands how large a transmit packet is and how to decode the transmit packet into meaningful data.

Figure 6:
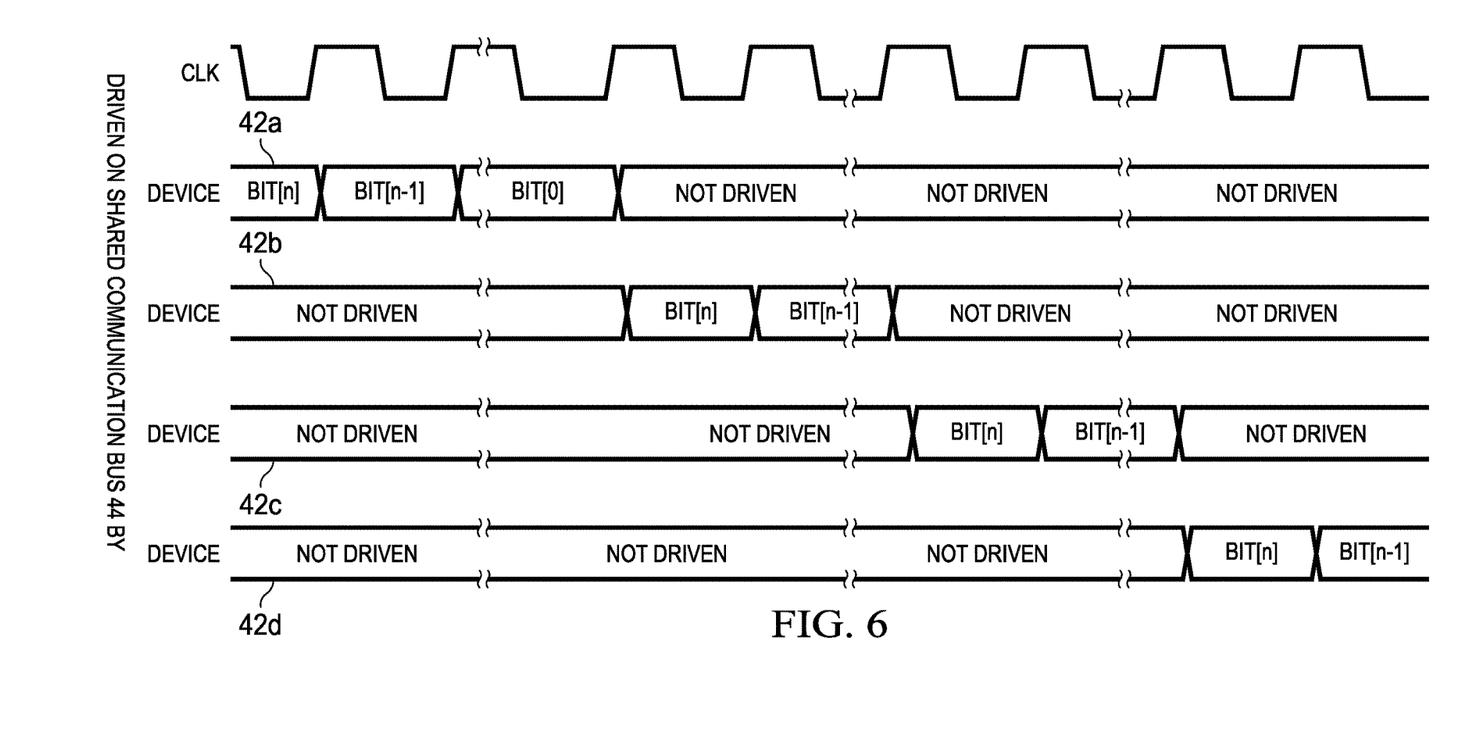
FIG. 6 illustrates an example timing diagram of how four devices on a single shared communication bus may share time slots if all devices were to all transmit an equal number of bits for each turn each has driving the shared communication bus, in accordance with embodiments of the present disclosure.

For example, FIG. 6 illustrates an example timing diagram of how four devices 42 on a single shared communication bus 44 may share time slots if all devices were to all transmit an equal number of bits "n" for each "turn" each device 42 has driving shared communication bus 44, in accordance with embodiments of the present disclosure. In this example, a first device 42a may be the master device and the first transmitting device on shared communication bus 44. During device 42a's transmission, other devices 42 may be configured to receive information via shared communication bus 44. After device 42a has transmitted its n bits, device 42b may then transmit data on shared communication bus 44 with the other devices 42 configured to receive information. Then device 42c may transmit data on shared communication bus 44 with the other devices 42 configured to receive information. Finally, device 42d may then transmit data on shared communication bus 44 with the other devices 42 configured to receive information. After each device 42 has had a turn transmitting n bits, the process may repeat one or more times with the same order of transmitting and receiving. The information sent by the one actively transmitting device 42 may be globally received and monitored by the other three devices 42 which are not transmitting at such particular time. Accordingly, data transmitted by a single device 42 via shared communication bus 44 may cause the other three devices 42 to respond as soon as the transmission is complete. Thus, each device 42 may need to have knowledge of the total number of devices 42 coupled to shared communication bus 44 and whether each device 42 is to transmit an equal number of bits so that: (1) it is transmitting and receiving at the appropriate times and (2) it is utilizing the synchronization data properly.

Thus, if common clock CLK is effectively free running, once the starting bit of the first device 42 to transmit to shared communication bus 44 is established, common clock CLK may effectively act as both a bit clock and time division counter for devices 42 to maintain communications synchronization. In this example, time division counting and handoff among devices 42 may be based on the number of n bits for all devices 42, but could be configured where devices 42 transmit an unequal number of bits. If each device is not transmitting an equal number of bits, devices 42 and/or the communication protocol may need to be pre-configured accordingly.

Accordingly, the communication protocol of the multi-device synchronization approach described herein may set a pre-configured time and a pre-determined order for each of the plurality of devices 42 to actively transmit data on shared communication bus 44, and the plurality of devices 42 may take turns transmitting data one at a time to the remaining number of the plurality of devices 42 through shared communication bus 44. In addition, the communication protocol may be a round-robin communication protocol, wherein within the round-robin communication protocol and after each of the plurality of devices 42 has actively transmitted data on the shared communication bus at the pre-configured time and at the pre-determined order, the process for actively transmitting data is repeated again for the plurality of devices 42 in the same pre-determined order.

In other embodiments, the communication protocol may dictate that one device 42 of distributed network 40 is to be a master of a master/slave relationship among device 42 with respect to shared communication bus 44, which may define which device 42 may initiate certain operations and/or has control of the bi-directional bus at which times. Such master/slave relationship among the devices 42 may be established based on a hardware configuration (such as with unique Inter-Integrated Circuit (I2C) addresses) or via user configuration prior to enabling the multi-device synchronization described herein. Such master/slave relationship may allow a user to perform tasks such as triggering a synchronized power up with a single write from a host processor (not shown) coupled to the master device 42 wherein one or more slave devices 42 are pre-configured in a wait state. Such pre-configured, master triggered response allows for simplified firmware development for the user and a level of robustness against timing variations of control port communications (e.g., I2C) to multiple devices. Often the time periods between subsequent control port writes to different devices 42 can vary, introducing a non-deterministic relationship between when multiple devices are actually being powered up relative to each other. The multi-device synchronization may allow for the slave devices 42 to be staged and the master device 42 to trigger the slave devices 42 to power up at the same time under the same conditions.

In accordance with the multi-device synchronization approach described herein, all data communications on shared communication bus 44 are directly between devices 42 to be synchronized to one another, with all of the necessary logic and decision making to remain captive within such synchronized devices 42, meaning that the synchronization or data does not need to be routed back to a host processor for purposes of intervention or device management. Thus, such synchronization among devices 42 may occur at a fast rate and low response delay in order to minimize the effect of any undesirable acoustic behavior that can occur when sharing information between devices, such as error conditions. For example, an event may occur on one device 42 which requires notification to a host processor and a change in configuration to other devices 42 in distributed network 40. However, unlike existing approaches in which the host processor is required to distribute the information regarding the change in configuration to the other devices 42, the device 42 experiencing the event may communicate the relevant information across shared communication bus 44. The other devices 42 may receive such information and respond (e.g., alter their own internal state information and/or their respective output signals) based on the information communicated over shared communication bus 44 instead of requiring a host processor to reconfigure each device 42 individually. Once the condition causing the event on the first device 42 is no longer present, the other three devices 42 may again be notified via shared communication bus 44, and normal operation may resume.

In some embodiments, when it is not necessary to communicate data across shared communication bus 44, shared communication bus 44 may remain idle. Such bus idling may minimize power consumption and may allow individual devices to dynamically decouple from shared communication bus 44 without impacting communications among the remaining devices. For example, if a host processor determines that a particular device 42 should be powered down, there may be no requirement that the other devices 42 be reconfigured. Because no information may be required to respond to the powered-down device's transmission slot, no action may be required by the other devices 42. To the other devices 42, it would be the same as if the powered-down device 42 were powered up but had no synchronization information to send.

Figure 7:
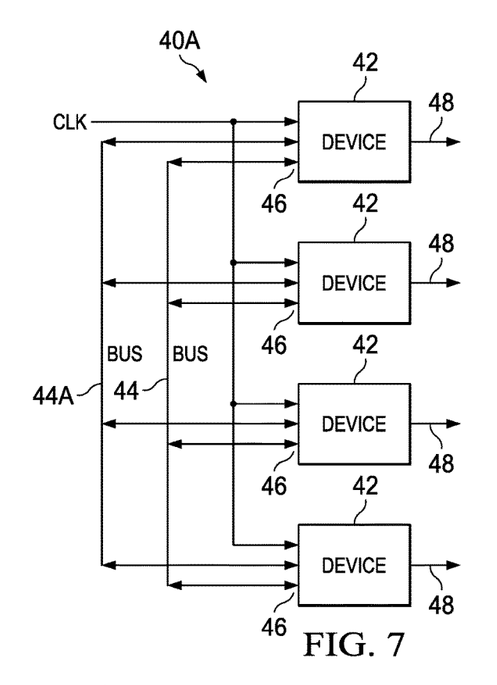
FIG. 7 illustrates a block diagram of selected components of a distributed network of devices coupled to one another via two communication buses, in accordance with embodiments of the present disclosure.
Figure 8:
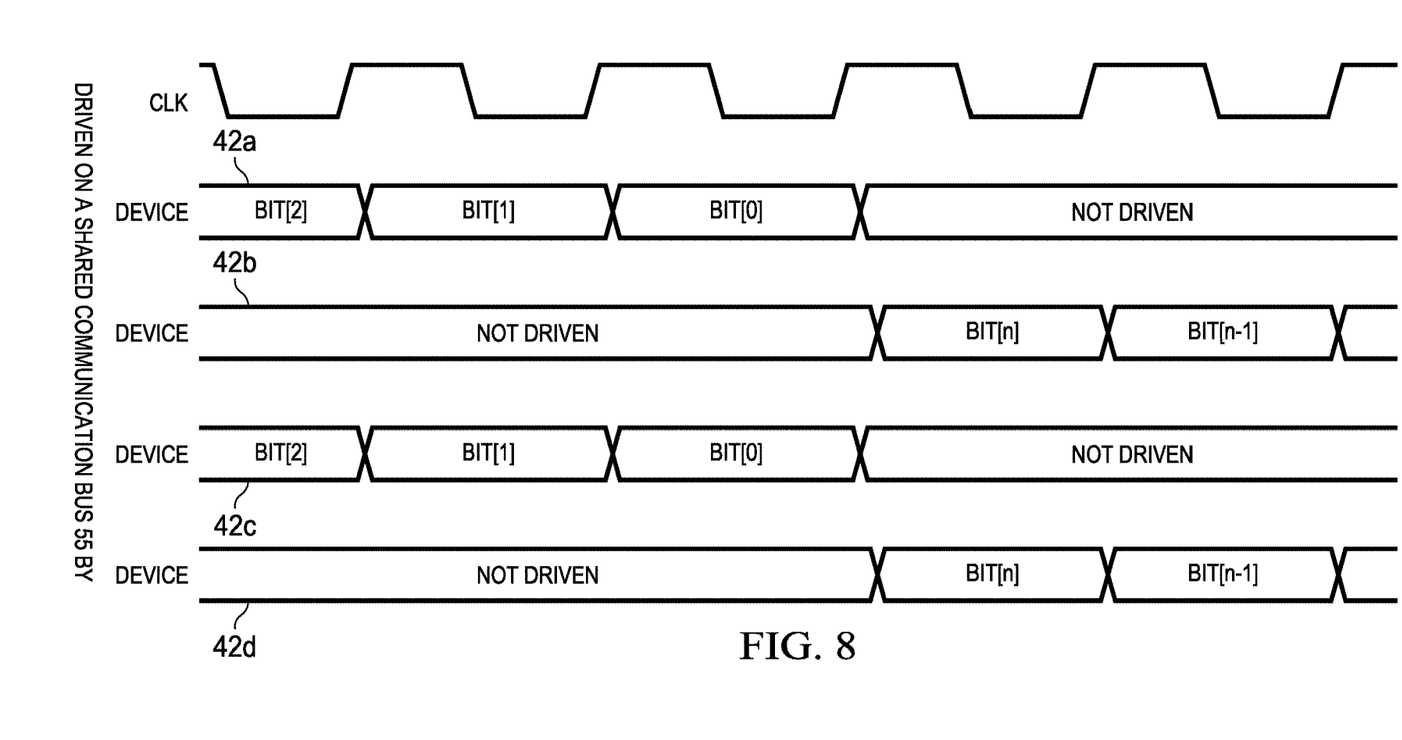
FIG. 8 illustrates an example timing diagram of how four devices on multiple shared communication buses may share time slots if all devices were to all transmit an equal number of bits for each turn each has driving the shared communication buses, in accordance with embodiments of the present disclosure.

If the bandwidth required for multiple devices 42 is more than a single shared communication bus 44 can handle at the frequency of common clock CLK, the multi-device synchronization can be expanded using a pair of shared communication buses 44 and 44A, as shown in FIG. 7. FIG. 7 illustrates a block diagram of selected components of a distributed network 40A of devices 42 coupled together via a communication bus 44 and a communication bus 44A, in accordance with embodiments of the present disclosure. With distributed network 40A, the single shared communication bus scheme of FIG. 4 is easily expanded to a multiple shared communication bus system which increases communications bandwidth among devices 42 without impacting frequency requirements of common clock CLK and demands on the external system comprising distributed network 40A, while maintaining a low-latency response from devices 42 being synchronized. In some embodiments, three or more shared communications buses may be utilized. As in the case with the single shared communication bus 44 of distributed network 40, a device 42 transmitting on one of shared communication buses 44, 44A transmits globally to all other devices on such communication bus. However, in distributed network 40A, a plurality of devices 42 may transmit data on shared communication buses 44, 44A at a given period in time. For example, as shown in FIG. 8, in a distributed network 40A having four devices 42, half of the transmission intervals may include devices 42a and 42c driving shared communication buses 44, 44A and the other half of the transmission intervals may include devices 42b and 42d driving shared communication buses 44, 44A, while all devices 42a, 42b, 42c, and 42d may receive data during all transmission intervals on at least one of shared communication buses 44, 44A.

Thus, when using two shared communication buses 44, 44A, when one of a plurality of devices 42 is actively transmitting data on shared communication bus 44, it may be disabled from receiving data on shared communication bus 44 but may be enabled to receive data from shared communication bus 44A. Likewise, when one of the plurality of devices 42 is actively transmitting data on shared communication bus 44A, it may be disabled from receiving data on shared communication bus 44A but may be enabled to receive data from the shared communication bus 44.

Although the foregoing discussion contemplates bi-directional communication established among the plurality of devices on shared communication buses 44, 44A is synchronous communication, in some embodiments, such bi-directional communication may be asynchronous.

In devices where using a dedicated multi-device shared synchronization bus is not possible or not practical, the multi-device synchronization communications may be embedded in an existing audio (or data) packet such as a pulse-code modulation (PCM) formatted word on a shared data bus. Thus, during some portions of time, instead of a shared data bus packet including audio data or other signal path data, a shared data bus packet may leverage the same rules (whether to transmit, whether to receive, bit depth, etc.) defined by the communications protocol described above, but instead of audio data or other signal path data, such packet may comprise multi-device synchronization data to be shared among devices 42 to be synchronized. Such manner of sharing of multi-device synchronization data may allow the multi-device synchronization data to leverage an existing protocol such as (but not limited to) I2S, TDM, or SoundWire.

To further illustrate, it is common for audio devices to have bi-directional buses for purposes of audio communication shared across multiple devices. This bi-directional communication allows audio data to be passed back and forth between the source(s) and the receiving device(s) on a single data bus. Embedding multi-device synchronization within a data packet formatted to look like an audio packet (such as a 24-bit PCM packet) on such audio data bus allows the synchronization data to be communicated on a shared audio bus without impacting the devices that do not need to be synchronized or aware of the synchronization data. Other than the additional bandwidth required for the multi-device synchronization packet, the fact that it is synchronization data and not audio data is transparent, with the multi-device synchronization packet being treated by the non-synchronized devices on the shared bus no differently than a portion of the audio stream which does not apply to that particular device.

Figure 9:
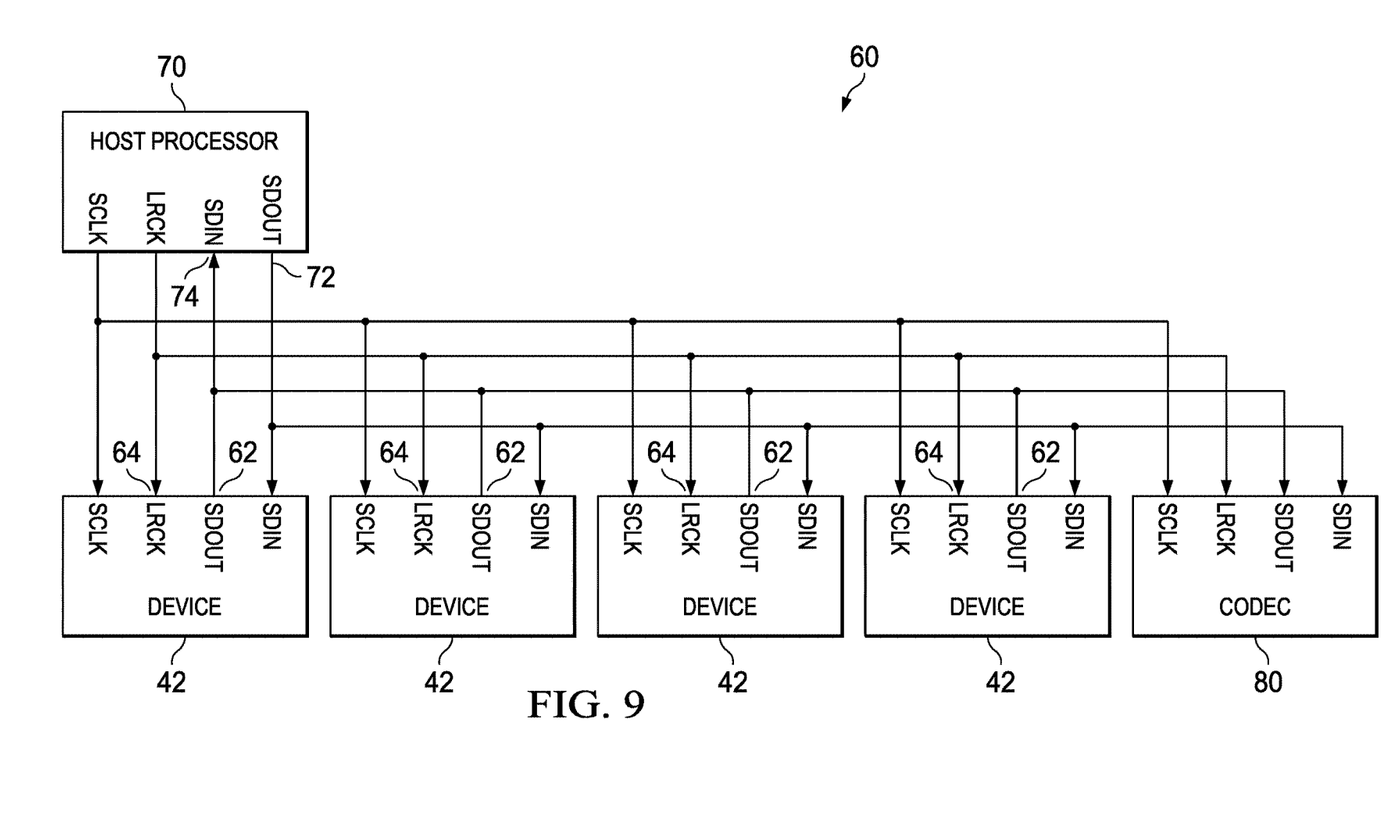
FIG. 9 illustrates a block diagram of selected components of a distributed network of devices configured to communicate multi-device synchronization data via a shared data bus, in accordance with embodiments of the present disclosure.

FIG. 9 illustrates a block diagram of selected components of a distributed network 60 of devices 42 configured to communicate multi-device synchronization data via a shared data bus, in accordance with embodiments of the present disclosure. In distributed network 60, devices 42 may all share a time-division multiplexing (TDM) serial audio bus which is coupled to a host processor 70. Host processor 70 may generate a bit clock SCLK and a frame clock LRCK which is received by devices 42 sharing the serial audio bus. Audio data from host processor 70 may be output via serial data output 72 of host processor 70 and received by the devices via the shared serial audio bus via serial data audio inputs 62 of devices 42. Data which is not needed to be received by a specific audio device 42 may simply be ignored. Audio data transmitted by an audio device via its respective serial data output 64 may be received by host processor 70 via the serial data input 74 of host processor 70. Each device 42 may be pre-configured in accordance with a communications protocol in order to determine when it should be transmitting data to the host processor 70 and when it should release the serial data bus for another device to transmit. Such pre-configuration of communication order may allow both the transmitting and receiving data paths of the serial audio bus to be shared among multiple audio devices. Embedding the multi-device synchronization information in an audio output packet from a device 42 may occur on each device's respective serial data output 64. As an example, a device 42 may transmit a data packet including multi-device synchronization information which appears to be an audio packet to the host processor 70 and a coder-decoder (CODEC) 80. However, other devices 42 may recognize that such packet contains multi-device synchronization and may be set to receive the information being transmitted via each device's respective serial data output 64. Thus, each device 42 may both transmit and receive on their respective serial data outputs 64. Each device 42 may need to be pre-configured to recognize when it is to transmit and when it is to receive on the shared serial data bus line.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A distributed network system, comprising:
    a shared communication bus configured to operate in accordance with a communication protocol; and
    a plurality of devices coupled to the shared communication bus;
    wherein:
        the communication protocol defines periods of time and an order by which each of the plurality of devices are configured to actively transmit data on the shared communication bus such that only one of the plurality of devices actively transmits data on the shared communication bus at a time to a remaining number of the plurality of devices through the shared communication bus;
        when the remaining number of the plurality of devices are not actively transmitting data, the remaining number of the plurality of devices are configured to receive data via the shared communication bus so that bi-directional communication is established among the plurality of devices on the shared communication bus;
        each of the plurality of devices is configured to maintain its own respective state information and operate in accordance with its own respective state information and data received via the shared communication bus in order to generate an output signal to an electrical node other than the shared communication bus;
        the communication protocol specifies a pre-configured time and a pre-determined order for each of the plurality of devices to actively transmit data on the shared communication bus;
        the plurality of devices are configured to take turns transmitting data one at a time to the remaining number of the plurality of devices through the shared communication bus; and
        the communication protocol is a round-robin communication protocol that specifies that after each of the plurality of devices has actively transmitted data on the shared communication bus at the pre-configured time and at the pre-determined order, the process for actively transmitting data is repeated again for the plurality of devices in the same pre-determined order.

2. The distributed network system of claim 1, wherein the output signal is one of an audio signal, an ultrasonic signal, and a haptic signal.

3. The distributed network system of claim 1, further comprising a second shared communication bus coupled to the plurality of devices, configured such that when one of the plurality of devices is actively transmitting data on the shared communication bus, such one of the plurality of devices is disabled from receiving data on the shared communication bus but is enabled to receive data from the second shared communication bus.

4. The distributed network system of claim 3, configured such that when a second one of the plurality of devices is actively transmitting data on the second shared communication bus, such second one of the plurality of devices is disabled from receiving data on the second shared communication bus but is enabled to receive data from the shared communication bus.

5. The distributed network system of claim 1, wherein each of the plurality of devices comprises one of a signal amplifier, a coder-decoder, a digital-to-analog converter, an analog-to-digital converter, and a sensor.

6. The distributed network system of claim 1, wherein the data communicated to the shared communication bus comprises at least one of status information regarding the distributed network system, status information regarding the device that transmitted the data, and a control parameter for controlling the plurality of devices.

7. The distributed network system of claim 1, wherein the bi-directional communication established among the plurality of devices on the shared communication bus is synchronous communication.

8. A method comprising:
defining periods of time and an order by which each of a plurality of devices coupled to a shared communication bus that operates in accordance with a round-robin communication protocol actively transmits data on the shared communication bus such that:
only one of the plurality of devices actively transmits data on the shared communication bus at a time to a remaining number of the plurality of devices through the shared communication bus;
when the remaining number of the plurality of devices are not actively transmitting data, the remaining number of the plurality of devices receive data via the shared communication bus so that bi-directional communication is established among the plurality of devices on the shared communication bus; and
each of the plurality of devices maintains its own respective state information and operates in accordance with its own respective state information and data received via the shared communication bus in order to generate an output signal to an electrical node other than the shared communication bus; and
setting a pre-configured time and a pre-determined order for each of the plurality of devices to actively transmit data on the shared communication bus, such that the plurality of devices take turns transmitting data one at a time to the remaining number of the plurality of devices through the shared communication bus;
wherein within the round-robin communication protocol and after each of the plurality of devices has actively transmitted data on the shared communication bus at the pre-configured time and at the pre-determined order, the process for actively transmitting data is repeated again for the plurality of devices in the same pre-determined order.

9. The method of claim 8, wherein the output signal is one of an audio signal, an ultrasonic signal, and a haptic signal.

10. The method of claim 8, further comprising defining periods of time and an order by which each of the plurality of devices actively transmits data to a second shared communication bus that operates in accordance with the round-robin communication protocol such that when one of the plurality of devices is actively transmitting data on the shared communication bus, such one of the plurality of devices is disabled from receiving data on the shared communication bus but is enabled to receive data from the second shared communication bus.

11. The method of claim 10, wherein when a second one of the plurality of devices is actively transmitting data on the second shared communication bus, such second one of the plurality of devices is disabled from receiving data on the second shared communication bus but is enabled to receive data from the shared communication bus.

12. The method of claim 8, wherein each of the plurality of devices comprises one of a signal amplifier, a coder-decoder, a digital-to-analog converter, an analog-to-digital converter, and a sensor.

13. The method of claim 8, wherein the data communicated to the shared communication bus comprises at least one of status information regarding the shared communication bus, status information regarding the device that transmitted the data, and a control parameter for controlling the plurality of devices.

14. The method of claim 8, wherein the bi-directional communication established among the plurality of devices on the shared communication bus is synchronous communication.

15. A device for use in a distributed network system, comprising:
a transmitter for actively transmitting data in accordance with a communication protocol on a shared communication bus configured to couple to the device and a plurality of other devices coupled to the shared communication bus;
a receiver for receiving data via the shared communication bus from at least one of the other devices; and
an output for generating an output signal to an electrical node other than the shared communication bus;
wherein:
the communication protocol defines periods of time and an order by which each of the device and other devices are configured to actively transmit data on the shared communication bus such that only one of the device and the other devices actively transmits data on the shared communication bus;
when the device is not actively transmitting data, the device is configured to receive data via the shared communication bus so that bi-directional communication is established among the device and the other devices on the shared communication bus; and
the device is configured to maintain its own respective state information and operate in accordance with its own respective state information and data that the device receives via the shared communication bus in order to generate the output signal;
the communication protocol specifies a pre-configured time and a pre-determined order for each of the device and the other devices to actively transmit data on the shared communication bus;
the device and the other devices are configured to take turns transmitting data one at a time to the remaining number of the plurality of devices through the shared communication bus; and
the communication protocol is a round-robin communication protocol that specifies that after each of the device and the other devices has actively transmitted data on the shared communication bus at the pre-configured time and at the pre-determined order, the process for actively transmitting data is repeated again for the device and the other devices in the same pre-determined order.

16. The device of claim 15, wherein the output signal is one of an audio signal, an ultrasonic signal, and a haptic signal.

17. The device of claim 15, wherein the device is further coupled to a second shared communication bus coupled to the other devices, wherein the device is configured such that when the device is actively transmitting data on the shared communication bus, the device is disabled from receiving data on the shared communication bus but is enabled to receive data from the second shared communication bus.

18. The device of claim 17, configured such that when the device is actively transmitting data on the second shared communication bus, the device is disabled from receiving data on the second shared communication bus but is enabled to receive data from the shared communication bus.

19. The device of claim 15, wherein the device comprises one of a signal amplifier, a coder-decoder, a digital-to-analog converter, an analog-to-digital converter, and a sensor.

20. The device of claim 15, wherein the data communicated to the shared communication bus comprises at least one of status information regarding the distributed network system, status information regarding the device or at least one of the other devices, and a control parameter for controlling the device.

21. The device of claim 15, wherein the bi-directional communication established among the device and the other devices on the shared communication bus is synchronous communication.

22. A distributed network system, comprising:
a shared communication bus configured to operate in accordance with a communication protocol;
a plurality of devices coupled to the shared communication bus; and
a second shared communication bus coupled to the plurality of devices;
wherein:
the communication protocol defines periods of time and an order by which each of the plurality of devices are configured to actively transmit data on the shared communication bus such that only one of the plurality of devices actively transmits data on the shared communication bus at a time to a remaining number of the plurality of devices through the shared communication bus;
when the remaining number of the plurality of devices are not actively transmitting data, the remaining number of the plurality of devices are configured to receive data via the shared communication bus so that bi-directional communication is established among the plurality of devices on the shared communication bus;
each of the plurality of devices is configured to maintain its own respective state information and operate in accordance with its own respective state information and data received via the shared communication bus in order to generate an output signal to an electrical node other than the shared communication bus;
when one of the plurality of devices is actively transmitting data on the shared communication bus, such one of the plurality of devices is disabled from receiving data on the shared communication bus but is enabled to receive data from the second shared communication bus; and
when a second one of the plurality of devices is actively transmitting data on the second shared communication bus, such second one of the plurality of devices is disabled from receiving data on the second shared communication bus but is enabled to receive data from the shared communication bus.

23. The distributed network system of claim 22, wherein the output signal is one of an audio signal, an ultrasonic signal, and a haptic signal.

24. The distributed network system of claim 22, wherein each of the plurality of devices comprises one of a signal amplifier, a coder-decoder, a digital-to-analog converter, an analog-to-digital converter, and a sensor.

25. The distributed network system of claim 22, wherein the data communicated to the shared communication bus comprises at least one of status information regarding the distributed network system, status information regarding the device that transmitted the data, and a control parameter for controlling the plurality of devices.

26. The distributed network system of claim 22, wherein the bi-directional communication established among the plurality of devices on the shared communication bus is synchronous communication.

27. A method comprising:
defining periods of time and an order by which each of a plurality of devices coupled to a shared communication bus that operates in accordance with a communication protocol actively transmits data on the shared communication bus such that:
only one of the plurality of devices actively transmits data on the shared communication bus at a time to a remaining number of the plurality of devices through the shared communication bus;
when the remaining number of the plurality of devices are not actively transmitting data, the remaining number of the plurality of devices receive data via the shared communication bus so that bi-directional communication is established among the plurality of devices on the shared communication bus; and
each of the plurality of devices maintains its own respective state information and operates in accordance with its own respective state information and data received via the shared communication bus in order to generate an output signal to an electrical node other than the shared communication bus; and
defining periods of time and an order by which each of the plurality of devices actively transmits data to a second shared communication bus that operates in accordance with the communication protocol such that:
when one of the plurality of devices is actively transmitting data on the shared communication bus, such one of the plurality of devices is disabled from receiving data on the shared communication bus but is enabled to receive data from the second shared communication bus; and
when a second one of the plurality of devices is actively transmitting data on the second shared communication bus, such second one of the plurality of devices is disabled from receiving data on the second shared communication bus but is enabled to receive data from the shared communication bus.

28. The method of claim 27, wherein the output signal is one of an audio signal, an ultrasonic signal, and a haptic signal.

29. The method of claim 27, wherein each of the plurality of devices comprises one of a signal amplifier, a coder-decoder, a digital-to-analog converter, an analog-to-digital converter, and a sensor.

30. The method of claim 27, wherein the data communicated to the shared communication bus comprises at least one of status information regarding the shared communication bus, status information regarding the device that transmitted the data, and a control parameter for controlling the plurality of devices.

31. The method of claim 27, wherein the bi-directional communication established among the plurality of devices on the shared communication bus is synchronous communication.

32. A device for use in a distributed network system, comprising:
a transmitter for actively transmitting data in accordance with a communication protocol on a shared communication bus configured to couple to the device and a plurality of other devices coupled to the shared communication bus;

a receiver for receiving data via the shared communication bus from at least one of the other devices; and an output for generating an output signal to an electrical node other than the shared communication bus;

wherein:

the communication protocol defines periods of time and an order by which each of the device and other devices are configured to actively transmit data on the shared communication bus such that only one of the device and the other devices actively transmits data on the shared communication bus;

when the device is not actively transmitting data, the device is configured to receive data via the shared communication bus so that bi-directional communication is established among the device and the other devices on the shared communication bus;

the device is configured to maintain its own respective state information and operate in accordance with its own respective state information and data that the device receives via the shared communication bus in order to generate the output signal;

the device is further coupled to a second shared communication bus coupled to the other devices, wherein the device is configured such that when the device is actively transmitting data on the shared communication bus, the device is disabled from receiving data on the shared communication bus but is enabled to receive data from the second shared communication bus; and when the device is actively transmitting data on the second shared communication bus, the device is disabled from receiving data on the second shared communication bus but is enabled to receive data from the shared communication bus.

33. The device of claim 32, wherein the output signal is one of an audio signal, an ultrasonic signal, and a haptic signal.

34. The device of claim 32, wherein the device comprises one of a signal amplifier, a coder-decoder, a digital-to-analog converter, an analog-to-digital converter, and a sensor.

35. The device of claim 32, wherein the data communicated to the shared communication bus comprises at least one of status information regarding the distributed network system, status information regarding the device or at least one of the other devices, and a control parameter for controlling the device.

36. The device of claim 32, wherein the bi-directional communication established among the device and the other devices on the shared communication bus is synchronous communication.

* * * * *

UNITED STATES PATENT AND TRADEMARK OFFICE
CERTIFICATE OF CORRECTION

| | |
|---|---|
| PATENT NO. | : 10,205,672 B2 |
| APPLICATION NO. | : 15/226197 |
| DATED | : February 12, 2019 |
| INVENTOR(S) | : May et al. |

It is certified that error appears in the above-identified patent and that said Letters Patent is hereby corrected as shown below:

In the Specification

In Column 5, Line 44, delete "$Y_{IN}$" and insert -- $V_{IN}$ --, therefor.

Signed and Sealed this
Fourteenth Day of May, 2019

Andrei Iancu
*Director of the United States Patent and Trademark Office*